(12) United States Patent
Mackin

(10) Patent No.: US 7,739,861 B2
(45) Date of Patent: Jun. 22, 2010

(54) CORN HEAD CLUTCH MONITOR

(75) Inventor: Ryan P. Mackin, Milan, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/207,996

(22) Filed: Sep. 10, 2008

(65) Prior Publication Data

US 2009/0192734 A1 Jul. 30, 2009

Related U.S. Application Data

(60) Provisional application No. 61/024,410, filed on Jan. 29, 2008.

(51) Int. Cl.
*A01D 41/127* (2006.01)

(52) U.S. Cl. .................................. 56/10.2 G

(58) Field of Classification Search .............. 56/10.2 R, 56/10.2 A–10.2 H, 10.3, 10.6, 10.8, 11.3, 56/11.4, 11.5; 460/1–3, 6, 59, 119, 149
See application file for complete search history.

(56) References Cited

U.S. PATENT DOCUMENTS

| | | | |
|---|---|---|---|
| 3,643,767 A * | 2/1972 | Fleming | ........................ 192/21 |
| 4,244,162 A | 1/1981 | Pucher | |
| 5,855,108 A * | 1/1999 | Salz et al. | ................. 56/10.2 G |
| 6,381,932 B1 * | 5/2002 | Clauss | ....................... 56/10.2 J |
| 6,843,044 B2 | 1/2005 | Clauss | |
| 6,984,171 B2 * | 1/2006 | Brome et al. | .................. 460/59 |
| 7,373,235 B2 * | 5/2008 | Werner et al. | .................. 701/67 |
| 2006/0276949 A1 | 12/2006 | Beck et al. | |

FOREIGN PATENT DOCUMENTS

| | | |
|---|---|---|
| DE | 202005003236 U1 | 6/2005 |
| DE | 102004031693 A1 | 1/2006 |
| FR | 1224956 A | 6/1960 |

OTHER PUBLICATIONS

European Search Report dated Jun. 22, 2009, (6 pages).

* cited by examiner

*Primary Examiner*—Robert E Pezzuto
(74) *Attorney, Agent, or Firm*—Taylor & Aust, P.C.

(57) ABSTRACT

A system for determining slippage of row unit or chopping unit slip clutches of a corn head includes a microcomputer coupled to at least one vibration sensor and a display or aural annunciator. A slipping clutch or group of clutches including a slipping clutch may be identified by recognizing a speed dependent predominant frequency. A slipping clutch or group of clutches including a slipping clutch may be identified by comparing magnitudes or times of receipt of vibrations from a pair of sensors. A slipping clutch or group of clutches including a slipping clutch may also be identified by comparing vibrations received from a single sensor with known location identifying magnitudes.

20 Claims, 4 Drawing Sheets

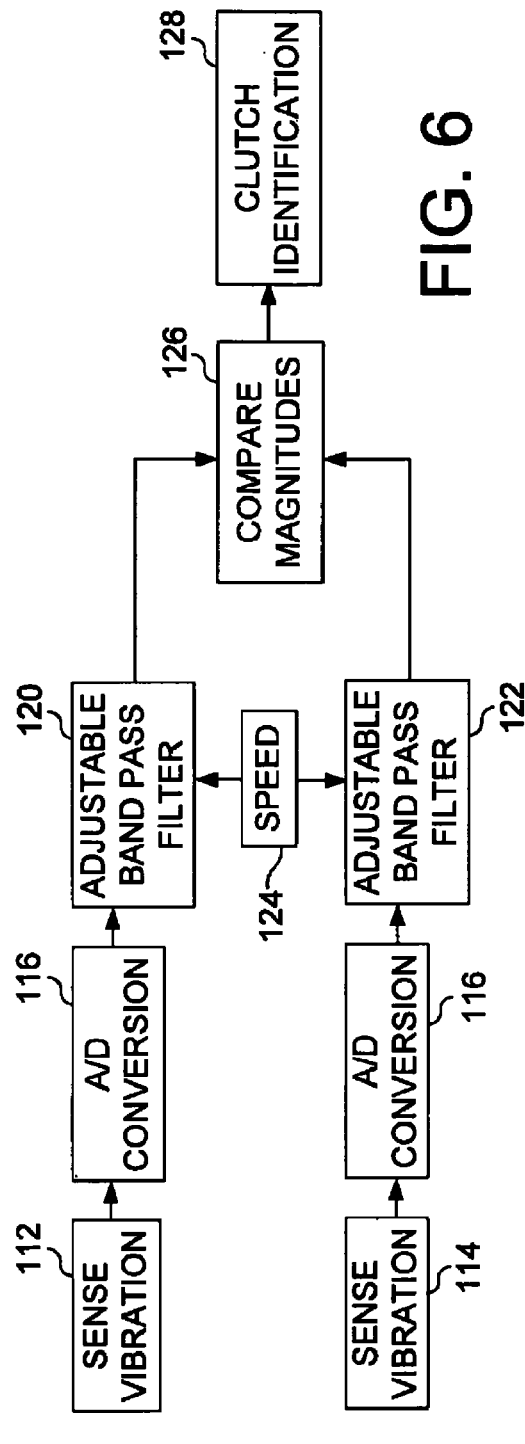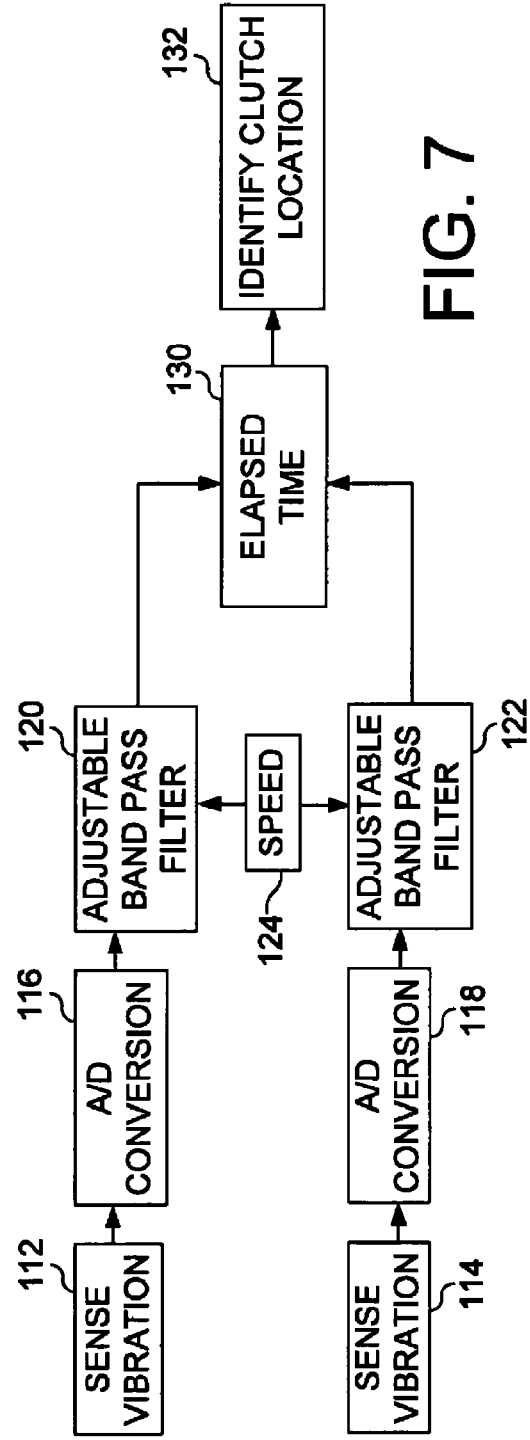

CORN HEAD CLUTCH MONITOR

CROSS REFERENCE TO RELATED APPLICATIONS

This application claims the benefit of U.S. Provisional Application No. 61/024,410, filed Jan. 29, 2008.

FIELD OF THE INVENTION

The present invention relates to agricultural harvesters, and more particularly, to monitors for sensing slippage in corn head clutches.

BACKGROUND OF THE INVENTION

As is well known, harvesters may be equipped with a variety of interchangeable gatherer units to suit particular crops or harvesting conditions. Corn heads are used with base units to permit the harvesting of corn. The corn head is a row crop device and so is equipped with a series of shrouds or snouts which function as divider points for guiding plants or stalks into the throats of the respective row units as the combine advances down the rows of standing crop. Gatherer chains then guide the stalks rearwardly relative to the corn head while stalk rolls pull the stalk down and corn ears are snapped from the stalk by deck plates. The gatherer chains convey the ears rearwardly and upwardly and deliver them to a trough having a cross auger extending laterally, immediately behind and spanning the row units. The auger rotating in the auger trough pulls the ears of corn to a laterally central region of the corn head. A central conveyor receives the ears and conveys them backwards through a hole on the rear wall of the corn head, then through a feeder house and then into the vehicle where the ears are threshed, and the corn kernels cleaned and stored. Many corn heads include optional chopping units each having a rotatable blade located beneath the stalk rolls for cutting and shredding the downwardly moving corn stalks which may then be left in the field to decompose. Corn heads include a frame, including a toolbar extending across the width of the frame to which row units and chopping units are attached. The row units and chopping units are driven by a laterally extending drive shaft that extends through all of the row units and chopping units.

During normal operation, one or more row or chopping units will occasionally become jammed with foreign material and stop operating altogether. When this happens, the drive shaft continues rotating, but is mechanically released from the stopped unit by disengaging a slip clutch that couples the drive shaft to the unit, thereby permitting the drive shaft to continue rotating even though the row unit or chopping unit is jammed. This clutch slippage cannot continue indefinitely, however, since a slipping slip clutch can overheat to destruction in just a few minutes during normal operation through the field. The clutch slips whenever the row unit or chopping unit is jammed, rubbing metal against metal. If this jammed row unit/jammed chopping unit condition is not detected, a clutch could burn up in as little as 5-10 minutes.

As a further complication, it is impossible for the operator to see whether clutches are slipping. The slip clutches are invisible from the operator station. The chopping units, if present, are disposed underneath the corn head where they cannot be seen and the row units are disposed underneath the covers or shrouds that guide the corn plants into the row units. The covers, sometimes called snouts, are not illustrated.

Typically, the only indication is the noise generated by the slipping clutch. Unfortunately, agricultural harvesters are noisy and it can be very difficult if not impossible to hear this clutch noise.

Row and chopping unit jams could be detected by using shaft speed sensors located at each of the row and chopping units. This solution, however, would require a sensor for each unit and considerably cabling to connect all the sensors to a single sensing system and therefore are not used in any production corn head.

U.S. Pat. No. 6,843,044 B2 discloses an arrangement for the detection of a crop jam in a front harvesting attachment or a harvesting machine having an overload clutch inserted into the driveline of a crop conveying element of the harvesting machine that interrupts the driveline, in the case that an established torque limit is exceeded due to a crop jam. The overload clutch, which may be a cam-controlled clutch, is inserted into the driveline of the conveyor arrangement between the conveyor arrangement and an articulated shaft that connects it with a gearbox providing its mechanical drive. The overload clutch separates the driveline of the conveyor arrangement when the torque transmitted by the overload clutch exceeds an established limit value determined by the overload clutch. Generally, the overload is caused by a crop jam in the conveyor arrangement. The slip clutch generates acoustic or mechanical vibrations. The detection arrangement is equipped with a sensor that can, if necessary, receive these vibrations and detects them with the use of an appropriate analog and/or digital signal processor. A control arrangement connected with the sensor can inform the operator of the harvesting machine acoustically and/or optically in case of a crop jam, or even take appropriate steps automatically to remove the crop jam, particularly turning off the drive of the crop conveying element, raising a hold-down arrangement of a pick-up or a reel of a cutter head, and/or reversing the drive of the crop conveying element.

SUMMARY OF THE INVENTION

The invention in one form is directed to an agricultural harvesting machine having a feeder housing to which a corn head is attached. The corn head has a frame attached to the machine feeder housing including a plurality of row units, a common drive shaft, a like plurality of slip clutches each coupling an individual row unit with the drive shaft, and at least one vibration sensor fixed to said frame for providing signals indicative of sensed vibrations. A processing unit receives and processes the vibration sensor signals to indicate slipping of at least one slip clutch.

The invention in another form is directed to a method monitoring a plurality of slip clutches in the drive mechanism of an agricultural implement by detecting mechanical vibrations in an implement frame member, band pass filtering the detected vibrations and examining the band passed vibrations for an indication of a slipping clutch event. An audible or visual indication of the occurrence of a slipping clutch event is provided.

BRIEF DESCRIPTION OF THE DRAWINGS

FIG. 6 is a flowchart of an embodiment of a method of operation of the present invention employing two sensors to identify a specific slipping clutch; and FIG. 7 is a flowchart of an embodiment of another method of operation of the present invention employing two sensors to identify a specific slipping clutch.

DETAILED DESCRIPTION OF THE INVENTION

Figure 1:
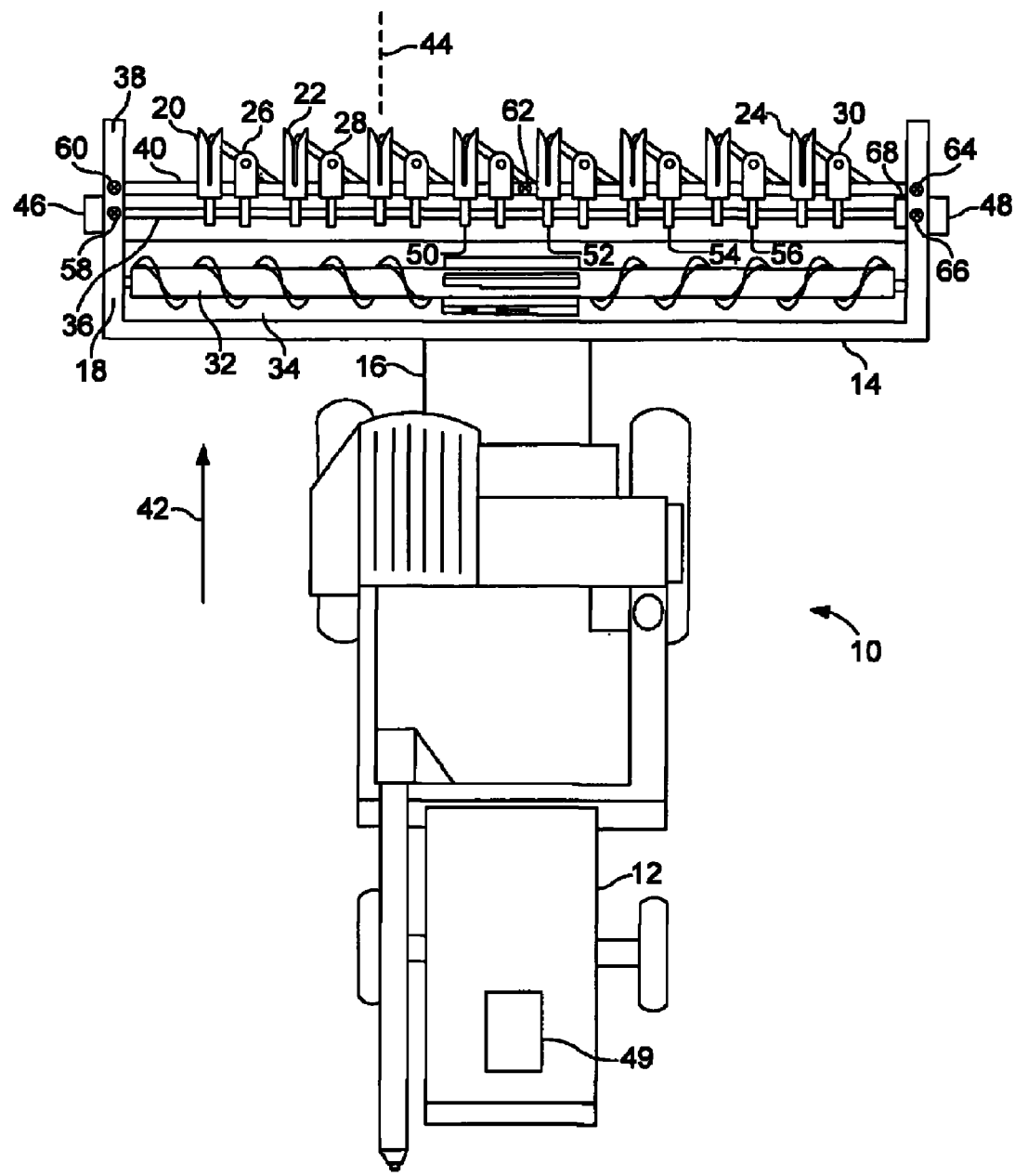
FIG. 1 is a schematic illustration of an embodiment of an agricultural harvesting machine of the present invention.

FIG. 1 illustrates an agricultural harvester 10 having a vehicle or base unit 12, corn head 14, feeder housing 16 coupling the corn head and vehicle, and a plurality of sensors for determining clutch slippage in accordance with the present invention. Row unit covers (sometimes also referred to as "snouts") normally disposed on top of the row units and chopper units have been removed to better show the drive shaft, row and chopper units. Several conventional row unit details have also been omitted for clarity. For example, a pair of endless lugged chains entrained on idler cogs near the unit free end and on powered cogs near the tool bar for pulling stalks into the gap and moving ears of corn toward the auger are not shown. The agricultural harvesting machine 10 can be seen to include a vehicle or base unit 12 and a corn head 14. Corn head 14 is supported on vehicle 12 by a feeder house 16. Corn head 14 includes a frame 18, a plurality of row units such as 20, 22 and 24 and like plurality of chopping units such as 26, 28 and 30 mounted on the frame 18. An auger 32 disposed in an auger trough 34 and a drive shaft 36 are both mounted on the frame. Frame 18 has a mainframe 38 and a toolbar 40 that is fixed to the mainframe. The toolbar extends across substantially the entire width of the corn head. The row units 20, 22, 24 are coupled to toolbar 40 and extend forward from the corn head 14 in a direction of normal forward travel, 42, to receive rows of corn plants such as 44 and process them. Each of the plurality of chopping units 26, 28, 30 are mounted adjacent to a corresponding row unit 20, 22, 24 to cut the stalk of each corn plant as it is pulled into the adjacent and corresponding row unit.

Drive shaft 36 is an elongate member extending the entire width of the corn head and is driven in rotation by gearboxes 46 and 48 located on each side of the corn head. The gearboxes 46, in turn, are coupled by a series of conventional mechanical or hydraulic drive elements (not shown) to engine 49 of the vehicle or base unit 12 to be driven thereby. Drive shaft 36 drivingly engages all of the row units such as 20, 22 and 24 and all of the chopping units such as 26, 28 and 30, which are located at a series of axially spaced locations across the width of the corn head. Drive shaft 36 may be a single piece shaft, as shown herein, or it may be divided into multiple shafts coupled to two or more gearboxes. In the latter case, drive shaft 36 may be broken in the middle (or at some other location). A first plurality of slip clutches such as 50 and 52 are coupled to and between row units 20, 22, 24 and drive shaft 36. A second plurality of slip clutches such as 54 and 56 are coupled to and between chopping units 26, 28, 30 and drive shaft 36, and are interleaved with slip clutches 50, 52. It will be understood that each of the row units has a corresponding slip clutch and each of the chopping units has a corresponding slip clutch.

The corn head further includes one or more vibration sensors 58, 60, 62, 64 and 66 coupled to the toolbar or the mainframe in various alternative locations. The vibration sensors are configured and disposed on the corn head to detect the vibrations of slipping slip clutches. More than one vibration sensor can be placed at any of these locations to provide additional functions as described in greater detail below. However, in its most simple embodiment, the system includes only one vibration sensor. In one position, a vibration sensor 60 is fixed to the frame generally adjacent to the left end of the toolbar. In another position, a vibration sensor 64 is fixed to the frame generally adjacent to the right end of the toolbar. In another position, a vibration sensor 62 is fixed to the frame generally in the middle of the toolbar. Vibration sensors may alternatively (or cumulatively) be located at or near locations 58 and 66, where drive shaft 36 is supported for rotation on frame 18. Depending upon the power of the vibrations in the corn head frame caused by clutch slippage, vibration sensor or sensors can be mounted farther from the row units and the chopping units or anywhere on the corn head.

Each vibration sensor may be implemented as an accelerometer or knock sensor that generates a signal indicating the frequency and amplitude of the vibrations of the frame of the corn head where the sensor is mounted. In particular, each vibration sensor 58, 60, 62, 64 and 66 is particularly configured to transmit signals at the frequencies generated by the vibrations of the slip clutches as they slip.

Figure 2:
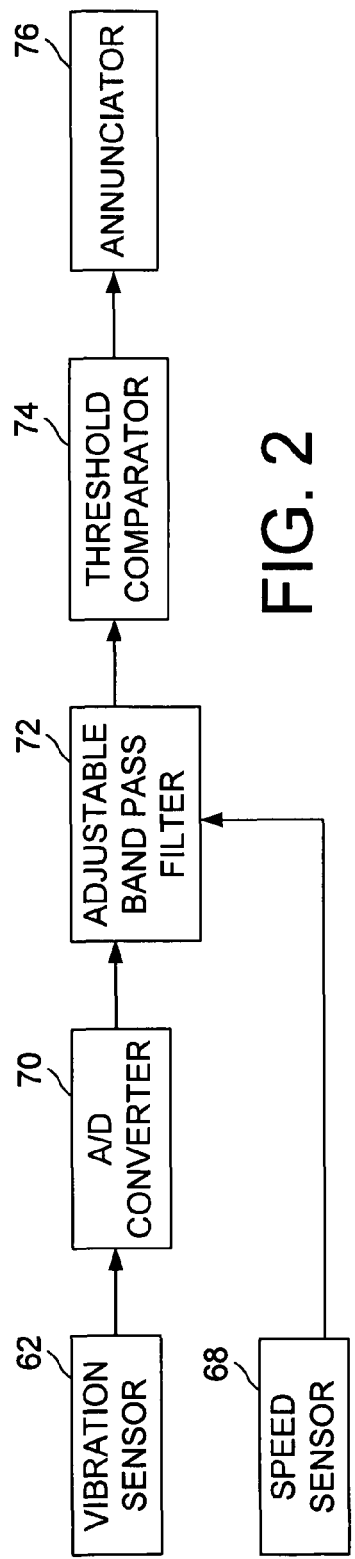
FIG. 2 is a schematic illustration of a processor for a single vibration sensor application.

Referring now to FIG. 2, a single vibration sensor, for example, the centrally located sensor 62 fixed to the toolbar 40 of FIG. 1 detects vibrations which are conveyed to an adjustable band pass filter 72 by way of an analog to digital converter 70. The band passed vibrations are then examined by comparator 74 to determine if the magnitude is sufficient to indicate a slipping clutch event. There are many sources of vibrations in the corn head frame. Unless otherwise eliminated or reduced, the vibrations caused by these other sources could prevent the processing unit from determining when a slip clutch was slipping. The slip clutches vibrate (and therefore generate vibrations in the corn head frame 18) at certain frequencies determined by physical characteristics of the clutch. The slip clutches may be of a "star" type having a pair of plates each having a radially extending pattern of teeth (alternate ridges and grooves) spring biased into engagement. Upon experiencing excess torque, the springs yield and the teeth "chatter" against one another. The vibrations are not sinusoidal, but are generally periodic having a repetition rate at a fundamental frequency with overtones of diminishing magnitude. The predominant or fundamental frequency is a product of the rotational speed of the clutch and the number of interengaging teeth. The rotational speed of the clutch is determined by sensor 68 which monitors drive shaft rotational speed. If the drive shaft 36 speed as sensed by sensor 68 is not the same as the rotational speed of the clutches, appropriate scaling will be required. Various types of slip clutches having teeth, lobes or detents (collectively called "lobes" herein) that engage each other on slip clutches similarly generate a predominant frequency. The pass band of the filter 72 is centered about this predominant frequency which is an integral multiple of the shaft rotational speed. If the magnitude of a passed frequency exceeds a predetermined threshold as indicated by comparator 74, an audio and/or visual indication is provided by annunciator 76. Annunciator 76 is generic to any electronic signaling device which can provide an indication of a slipping clutch event. It may be a simple audible sound, or a single indicator light for providing an indication of a slipping clutch event. It may also take a more complex form as a series of lights indicating, like an old-fashioned switch board, the source of an incoming signal, or a more sophisticated display panel. The processing unit of FIG. 2 has only one vibration sensor and the speed indication as inputs. Furthermore, the analog to digital converter 70 could be omitted and the processing unit may be implemented entirely with analog components.

Figure 3:
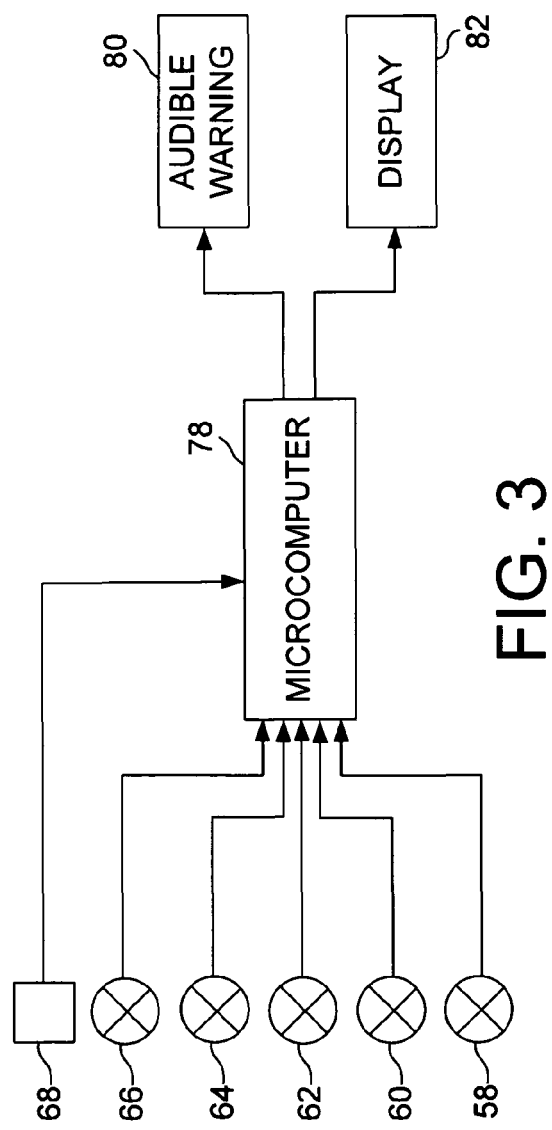
FIG. 3 is a schematic illustration of use of a microcomputer for applications employing one or more vibration sensors.

Referring now to FIG. 3, each of the vibration sensors 58, 60, 62, 64 and 66 is connected with a processing unit such as microcomputer 78. An analog to digital conversion may be performed by the microcomputer 78 or separate A/D converters may be provided. Microcomputer 78 is a digital microprocessor that is configured by a series of instructions stored in an internal memory. Microcomputer 78 includes signal conditioning units that are configured to receive signals from vibration sensors, process those signals in accordance to its series of instructions and transmit the signal indicating that a clutch is slipping to the display 82 or audio annunciator 80. The microcomputer may be configured to band pass filter the signal from the vibration sensor using a band pass filter whose parameters are determined based at least upon the speed of the drive shaft derived from sensor 68. The microcomputer may be configured to band pass filter the signal from the vibration sensor using a band pass filter that is dynamically modified to select a pass band including the clutch frequency. Exemplary modes of operation for the processing unit of FIG. 3 are illustrated in FIGS. 4-7.

Figure 4:
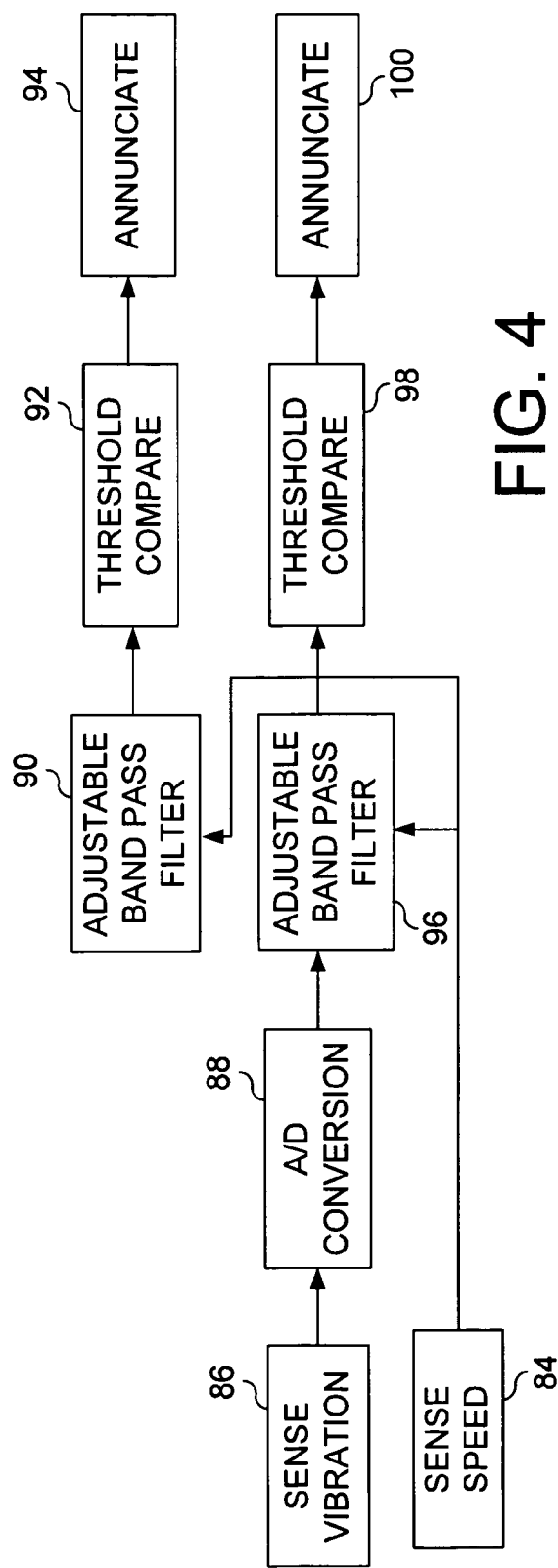
FIG. 4 is a flowchart of an embodiment of a method of operation of the present invention employing a single sensor to identify slippage in one of two groups of slip clutches.

In FIG. 4, the plurality of slip clutches may be at least two clutches or groups of clutches that have different clutch signatures (predominant frequencies), and further the microcomputer may be configured to distinguish a slipping clutch of these clutches or groups of clutches from the other clutches or groups or clutches by determining the clutch frequency of the slipping clutch. To do this, each slip clutch or each group of slip clutches are provided with different numbers of lobes, which cause each slip clutch or group of slip clutches to vibrate at different predominant frequencies. For example, in one embodiment the row units 20, 22, 24 are equipped with slip clutches having two lobes and the chopping units 26, 28, 30 are equipped with clutches having five lobes. In such an arrangement, for any speed ("Z") of drive shaft 36 the clutch frequency of a row unit slip clutch is 2 times Z, and the corresponding slip vibration frequency of the chopping unit is 5 times Z. The common physical characteristic (number of lobes) of one group of clutches and different common physical characteristic of the other group facilitates determining whether it is a row unit clutch or a chopping unit clutch that is slipping. As before, appropriate A/D conversion may be provided at 88. Microcomputer 78 creates two band pass filters 90 and 96. Filter 90 has a pass band centered at 2 times Z and filter 96 has a pass band centered at 5 times Z. The processing unit applies both filters periodically and consecutively to the signals received from vibration sensor 86. If the magnitude of the signal passing band pass filter 90 exceeds a threshold amplitude or power level as determined by comparison 92, microcomputer 78 enables the annunciator 94 signaling the operator that a row unit clutch is slipping. If the magnitude of the signal passing the 5 times Z band pass filter 96 exceeds a threshold amplitude or power level indicated by comparison 98, microcomputer 78 enables annunciator 100 signaling the operator that a chopping unit clutch is slipping. In a further configuration, each slip clutch has its own unique clutch frequency (e.g. unique number of lobes). Microprocessor 78 may be configured to uniquely determine which individual clutch of all the clutches are slipping in the same manner it distinguishes between the groups of clutches having clutch frequencies 2 times Z and 5 times Z in the example above.

Figure 5:
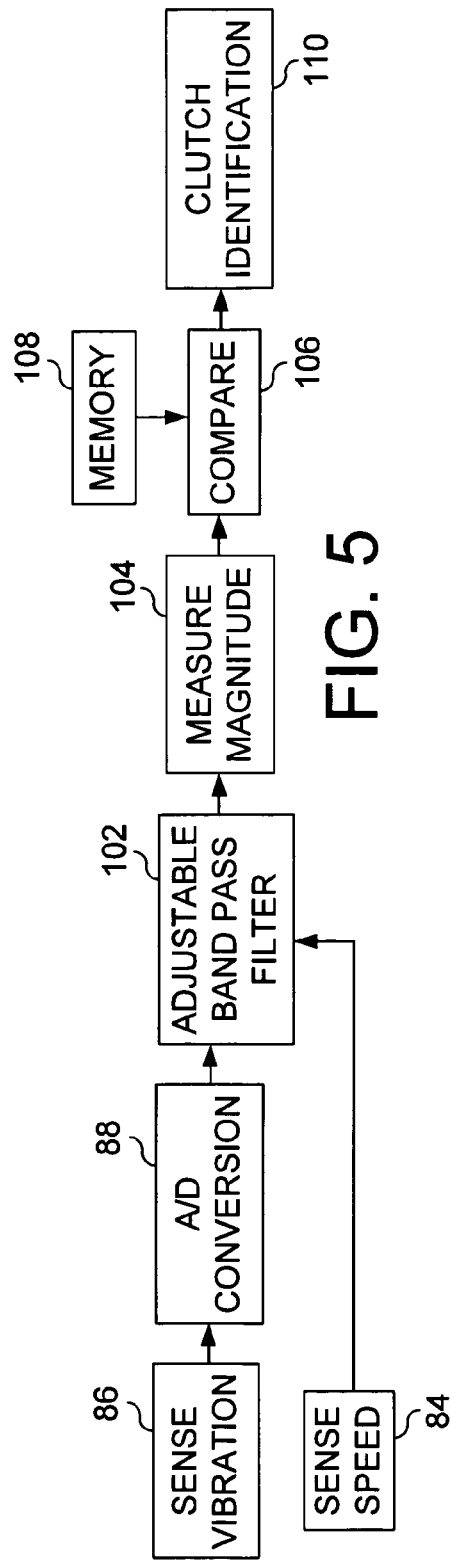
FIG. 5 is a flowchart of an embodiment of another method of operation of the present invention employing a single sensor to identify slippage of a particular slip clutch or in one of two more groups of slip clutches.

Referring now to FIG. 5, the magnitude of the vibrations passed by a single band pass filtration 102 are measured at 104 and microcomputer 78 is configured to determine the location or identity of a slipping slip clutch by reading the sensed vibrations 86 based on the magnitude of that one signal. The remoteness of a particular slipping clutch from the sensor location may be inferred from the magnitude of the sensed vibrations. For example, microcomputer 78 is configured to read the signal from a single sensor 60 located at an end of toolbar 40. When a slip clutch of a row unit or chopping unit slips, the vibrations the clutch conducts into the elongated tool bar are attenuated based upon their distance from the sensor 60. Microprocessor 78 receives the signal from sensor 60 and compares at 106 the magnitude of the received signal with reference magnitudes stored in its internal memory 108. It identifies at 110 the slip clutch that is slipping as the slip clutch corresponding to the closest match in actual magnitude versus reference magnitude and signals the operator using the display 82. In a preferred embodiment, microprocessor 78 indicates to the user which slip clutch is slipping (e.g. "the third row unit" or "the fifth chopping unit". The magnitude sensing 104 (whether using a single signal or a plurality of signals) is further enhanced by the microprocessor 78 band pass filtering the signals as described herein. Thus the system is capable of identifying the location and identity of individual clutches that are slipping based upon the magnitude of the signals received at one or more vibration sensors either by themselves, or in combination and by comparison to the magnitude of signals provided by one or more other vibration sensors.

The techniques illustrated by FIGS. 2, 4 and 5 have employed a single vibration sensor, however, FIGS. 6 and 7 address approaches employing two sensors. In FIG. 6, the microcomputer 78 described above is coupled to more than one vibration sensor each located at a different place on the corn head by the usual process of A/D conversion 116 and 118 and appropriate band pass filtration 120 and 122. Both band pass filtrations are performed over the same pass band as determined by the speed indication 124. Microcomputer 78 is configured to determine the location and identity of a slipping slip clutch of by comparing 126 the magnitude of vibration signals received by one vibration sensor at 112 with the magnitude of the vibration signal provided by another vibration sensor at 114 and determining where the slip clutch is based on the comparison 126. In one such configuration, the two sensors 60 and 64 can be located at either end of the tool bar and microcomputer 78 determines the location of the slipping clutch by ratioing the magnitude of the two signals. If the microcomputer 78 determines that the signal from both sensors is equal then it indicates that the clutch that is slipping is disposed midway between them identifying the clutch accordingly as at 128. Alternatively, if the magnitude of the signal at one sensor is greater than the magnitude of the signal at the other sensor, then the microcomputer 78 determines that the clutch that is slipping is disposed nearer the sensor with the greater signal in proportion to the magnitude of the signals and signals the operator accordingly. All clutches can be identified in this manner by identifying the magnitude of the signals from the sensors.

Referring now to FIG. 7, the same sensing, conversion and speed determined band pass filtration as in FIG. 6 is employed, however, microcomputer 78 is now configured to determine at 132 the location or identity of a slipping clutch by comparing the time of arrival of the vibrations (assuming they come from a common source of one slipping clutch) and determining based on the propagation delay (i.e. differences between the times of arrival at each sensor as indicated by timer 130) where the common source—the slipping clutch—must be located. The indication from one filtration may start timer 130 and the indication from the other filtration stop timer 130. If the time of arrival of each vibration is the same at all the sensors, the slipping clutch must be located at the same distance from each one. Of course, different materials may have different speeds of transmission of vibration.

Depending upon the particular type of corn head, the number of clutches and the structure of the corn head frame, microcomputer 136 can be configured to use any one or all of the above methods, either alone or in combination, to determine the location and identity of a slipping clutch on a corn head.

Having described the preferred embodiment, it will become apparent that various modifications can be made without departing from the scope of the invention as defined in the accompanying claims.

The invention claimed is:

1. An agricultural harvesting machine, comprising:
   a feeder housing; and
   a corn head having a frame attached to said feeder housing, said corn head including a plurality of row units, a common drive shaft, a like plurality of slip clutches each coupling an individual row unit with said drive shaft, at least one vibration sensor fixed to said frame for providing signals indicative of sensed vibrations, and a drive shaft speed sensor for providing a drive shaft rotational speed output, said processing unit utilizing the rotational speed output to band pass filter the sensed signals in a frequency range spanning an integral multiple of the rotational speed; and
   a processing unit for receiving and processing the vibration sensor signals to indicate slipping of at least one slip clutch.

2. The agricultural harvesting machine of claim 1, wherein said corn head further includes a second plurality of chopping units and a like second plurality of slip clutches each coupling an individual chopping unit with said drive shaft, said processing unit receiving and processing said vibration sensor signals to indicate slipping of at least one of said plurality and said second plurality of slip clutches.

3. The agricultural harvesting machine of claim 2, wherein said plurality of slip clutches possess a common physical characteristic which, upon slipping, induces a common repetition rate vibration in said frame, and said second plurality of slip clutches possess a different common physical characteristic which, upon slipping, induces a different common repetition rate vibration in said frame, said processing unit discriminating between the two repetition rates to distinguish between slipping of a chopping unit slip clutch and slipping of a row unit slip clutch.

4. The agricultural harvesting machine of claim 1, wherein said plurality of slip clutches including a first slip clutch and a second slip clutch, said first slip clutch having a first number of lobes, said second slip clutch having a second number of lobes, said first number being different from said second number, said band pass filter configured to distinguish slipping of said first slip clutch from said second slip clutch dependent upon said first number and said second number.

5. The agricultural harvesting machine of claim 1, wherein the processing unit comprises a microcomputer and at least one output annunciator for identifying a slipping clutch event.

6. The agricultural harvesting machine of claim 1, wherein the corn head frame includes a transversely extending tool bar for supporting each of the row units, and there is exactly one vibration sensor fixed to said frame tool bar midway between the individual row units.

7. A corn head for use in an agricultural harvesting machine, comprising:
   a frame;
   a plurality of row units fixed to said frame;
   a common drive shaft;
   a plurality of slip clutches each coupling an individual row unit with said drive shaft;
   at least one vibration sensor fixed to said frame for providing signals indicative of sensed vibrations;
   a processing unit for receiving and processing the vibration sensor signals to indicate slipping of at least one slip clutch; and
   a drive shaft speed sensor for providing a drive shaft rotational speed output, said processing unit utilizing the rotational speed output to band pass filter the sensed signals in a frequency range spanning an integral multiple of the rotational speed.

8. The corn head of claim 7, further including a plurality of chopping units and an additional plurality of slip clutches each coupling an individual chopping unit with said drive shaft, said processing unit receiving and processing said vibration sensor signals to indicate slipping of at least one of said plurality and said additional plurality of slip clutches.

9. The corn head of claim 8, wherein said plurality of slip clutches possess a common physical characteristic which, upon slipping, induces a common repetition rate vibration in said frame, and said additional plurality of slip clutches possess a different common physical characteristic which, upon slipping, induces a different common repetition rate vibration in said frame, said processing unit discriminating between the two repetition rates to distinguish between slipping of a chopping unit slip clutch and slipping of a row unit slip clutch.

10. The corn head of claim 7, wherein said plurality of slip clutches includes a first slip clutch and a second slip clutch, said first slip clutch having a first number of lobes, said second slip clutch having a second number of lobes, said first number being different from said second number, said band pass filter configured to distinguish slipping of said first slip clutch from said second slip clutch dependent upon said first number and said second number.

11. A method of monitoring a plurality of slip clutches in the drive mechanism of a agricultural implement, comprising:
   detecting mechanical vibrations in an implement frame member;
   band pass filtering the detected vibrations;
   examining the band pass filtered vibrations for an indication of a slipping clutch event; and
   providing an indication of the occurrence of a slipping clutch event.

12. The method of claim 11, including the further steps of determining the rotational speed of a non-slipping clutch, and selecting the pass band of the band pass filtering step to include a predetermined multiple of the clutch rotational speed.

13. The method of claim 12, further including performing a second band pass filtering of the detected vibrations in a second selected pass band which includes a second predetermined multiple of the clutch rotational speed.

14. The method of claim 13, wherein the step of examining includes examining each selected pass band separately to determine which of two subsets of the plurality of slip clutches is slipping.

15. The method of claim 14, wherein the predetermined multiple and second predetermined multiple are determined by physical characteristics of the two subsets of the plurality of slip clutches.

16. The method of claim 11, wherein the step of examining includes determining the magnitude of the band pass filtered vibrations and utilizing the determined magnitude to infer the remoteness of the particular slipping clutch from the location at which the vibrations were sensed.

17. The method of claim 16 wherein the determined magnitude is compared with a plurality of predetermined magnitudes and the closest comparison is utilized to identify a specific slipping clutch.

18. The method of claim 11, wherein the step of detecting includes sensing for mechanical vibrations at two distinct locations on the frame member, the step of band pass filtering includes filtering detected vibrations from each location separately, and the step of examining includes comparing the magnitudes of the separately filtered detected vibrations to determine the location of a slipping clutch relative to the two locations.

19. The method of claim 11, wherein the step of providing an indication includes identifying a particular slipping clutch.

20. The method of claim 11, wherein the step of detecting includes sensing for mechanical vibrations at two distinct locations on the frame member, the step of band pass filtering includes filtering detected vibrations from each location separately, and the step of examining includes comparing the time of occurrence of the separately filtered detected vibrations to determine the location of a slipping clutch relative to the two locations.

* * * * *